United States Patent
Ando et al.

(10) Patent No.: US 6,622,690 B2
(45) Date of Patent: Sep. 23, 2003

(54) DIRECT INJECTION TYPE INTERNAL COMBUSTION ENGINE AND CONTROLLING METHOD THEREFOR

(75) Inventors: Hiromitsu Ando, Aichi (JP); Jun Takemura, Aichi (JP); Kazunari Kuwabara, Gifu (JP); Shigeo Yamamoto, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/875,900

(22) Filed: Jun. 8, 2001

(65) Prior Publication Data

US 2002/0000209 A1 Jan. 3, 2002

(30) Foreign Application Priority Data

Jun. 8, 2000 (JP) ........................................ 2000-172415

(51) Int. Cl.[7] ........................ F02B 17/00; F02B 69/06; F02B 75/02
(52) U.S. Cl. ........................ 123/295; 123/37; 123/64; 123/300
(58) Field of Search .............................. 123/21, 64, 37, 123/299, 300, 295

(56) References Cited

U.S. PATENT DOCUMENTS 3,709,201 A * 1/1973 Cook ........................... 123/64
6,286,466 B1 * 9/2001 Braun et al. .............. 123/64 X
6,443,108 B1 * 9/2002 Brehob et al. ................. 123/64

FOREIGN PATENT DOCUMENTS

JP          9-4459 A         1/1997

* cited by examiner

Primary Examiner—Tony M. Argenbright
(74) Attorney, Agent, or Firm—Birch, Stewart, Kolasch & Birch, LLP (57) ABSTRACT

A direct injection type internal combustion engine has an intake and exhaust mechanism for intaking and exhausting air for a predetermined period of time between a second half of a second expansion stroke and a first half of a first compression stroke following the second expansion stroke so that the first compression stroke, a first expansion stroke, a second compression stroke, and the second expansion stroke can be repeated sequentially along with rotation of a crank shaft; and a control device for controlling fuel injection. The control device injects first fuel during the first compression stroke and injects second fuel during the first expansion stroke or the second compression stroke. Therefore, the first fuel executes the first combustion process, and the second fuel is then injected into burnt gases generated in the first combustion process to enable a second combustion process following the first combustion process.

22 Claims, 5 Drawing Sheets

① INTAKE
② COMPRESSION
③ EXPANSION
④ COMPRESSION
⑤ EXPANSION
⑥ EXHAUST

Fig. 4

Fig. 5(a)
② COMPRESSION STROKE
INJECT FUEL INTO RESIDUAL GASES AND NEW AIR

Fig. 5(b)
② COMPRESSION STROKE
SPARK IGNITION

Fig. 5(c)
③ EXPANSION STROKE
LEAN STRATIFIED CHARGE COMBUSTION

Fig. 5(d)
③ EXPANSION STROKE
INJECT FUEL INTO BURNT GASES

TEMPERATURE IS HIGH, AND MANY ACTIVE SUBSTANCES AND SURPLUS OXYGEN COEXIST

Fig. 5(e)
④ COMPRESSION STROKE
HIGH-TEMPERATURE GAS COMPRESSION

DECOMPOSITION OF FUEL PROCEEDS DUE TO HIGH TEMPERATURE

Fig. 5(f)
⑤ EXPANSION STROKE
SPARK IGNITION OR MULTI-POINT IGNITION COMBUSTION

Fig. 6

DIRECT INJECTION TYPE INTERNAL COMBUSTION ENGINE AND CONTROLLING METHOD THEREFOR

This application claims the benefit of Japanese Application No. 2000-172415, filed on Jun. 8, 2000, which is hereby incorporated by reference.

BACKGROUND OF THE INVENTION

1. Field of the Invention

This invention relates to a direct injection type internal combustion engine that sequentially repeats a first compression stroke, a first expansion stroke, a second compression stroke, and a second expansion stroke with the rotation of a crank shaft of the engine.

2. Description of Related Art

In recent years, an internal combustion that improves a combustion cycle to achieve a high efficiency and the purification of exhaust gases has been developed.

For example, Japanese Patent Provisional Publication No. 9-4459 discloses an engine that has a main combustion chamber and a sub combustion chamber, each of which is provided with a spark plug. This engine aims at improving a stoichiometrical thermal efficiency by performing two expansion strokes in one compression stroke in such a manner that a main combustion chamber (main chamber) and a sub combustion chamber (sub chamber) ignite the interior mixture by respective spark plugs to perform combustion independently from each other.

In the above prior art, there is the necessity of providing the sub combustion chamber in addition to the normally-provided combustion chamber (main combustion chamber) and providing a spark plug in each of the main combustion chamber and the sub combustion chamber. This complicates the structure of the engine and requires a very high manufacturing cost. Moreover, the prior art is not so different from the normal internal combustion engines with respect to the exhaust gas characteristics because the main chamber mixture and the sub chamber mixture are only burned in different timings in order to perform two expansion strokes in one compression stroke.

SUMMARY OF THE INVENTION

It is therefore an object of the present invention to provide a direct injection type internal combustion engine that improves fuel economy and purifies exhaust gases in a more refined manner without significantly increasing a manufacturing cost.

To attain the above object, the present invention provides a direct injection type internal combustion engine comprising: an intake and exhaust mechanism for taking in and exhausting air for a predetermined period of time between a second half of a second expansion stroke and a first half of a first compression stroke following the second expansion stroke so that the first compression stroke, a first expansion stroke, a second compression stroke, and the second expansion stroke can be repeated sequentially with rotation of a crank shaft in the internal combustion engine; a control device for controlling injection of fuel supplied to at least a combustion chamber in the internal combustion engine; and the control device for carrying out a controlling operation to inject first fuel in one of the first compression stroke and inject second fuel in one of the first expansion stroke and the second compression stroke.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 5(a)–5(f) are conceptual sectional views showing the operation of the direct injection type internal combustion engine according to the embodiment of the present invention, wherein

DETAILED DESCRIPTION OF THE PREFERRED EMBODIMENT

A preferred embodiment of the present invention will hereunder be described in further detail with reference to the accompanying drawings.

There will now be described a direct injection type internal combustion engine according to the embodiment of the present invention. FIGS. 1–5 show the direct injection type internal combustion engine according to this embodiment.

First, a description will be given of the structure of the direct injection type internal combustion engine (hereinafter also referred to as engine) according to this embodiment.

Figure 1:
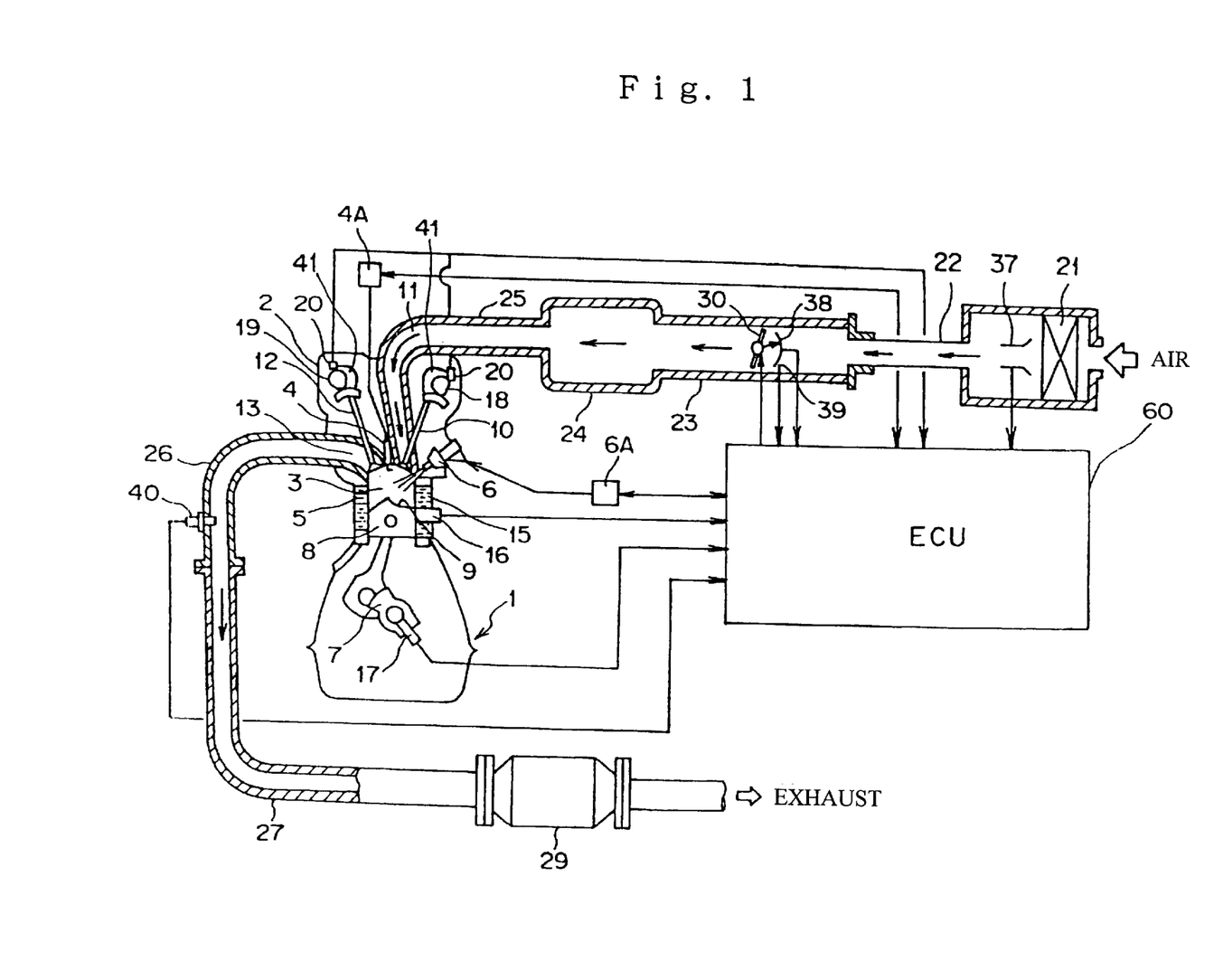
FIG. 1 is a diagram showing a direct injection type internal combustion engine according to an embodiment of the present invention.

As shown in FIG. 1, a spark plug 4 and a fuel injection valve 6, which opens directly in a combustion chamber 5, are mounted on a cylinder head 2 of every cylinder 3 in the engine 1. An ignition coil 4A drives the spark plug 4, and a driver 6A drives the fuel injection valve 6.

In the cylinder 3, a piston 8 is connected to a crank shaft 7, and a semispherically-concaved cavity 9 is formed at the top of the piston 8.

The cylinder head 2 is provided with an intake port 11 connected to the combustion chamber 5 via an intake valve 10, and an exhaust port 13 connected to the combustion chamber 5 via an exhaust valve 12. An intake port 11 is disposed in a substantially upright position at the upper part of the combustion chamber 5, and forms a longitudinal swirl flow (which swirls clockwise in FIG. 1) of the intake air in the combustion chamber 5 in cooperation with the cavity 9 formed at the top of the piston 8.

A water jacket 15, formed in the outer circumference of the cylinder 3, is provided with a water temperature sensor 16 that detects temperature of a cooling water. The crank shaft 7 is provided with a crank angle sensor that outputs a signal at a predetermined crank angle. Cam shafts 18, 19 for driving the intake valve 10 and the exhaust valve 12 are each provided with a cylinder identification sensor (cam angle sensor) 20 that outputs a cylinder identification signal according to a cam shaft position.

An adjustable valve mechanism 41 is provided between the cam shafts 18, 19 and the intake valve 10 and the exhaust valve 12, respectively, to selectively switch an operation mode between a normal operation mode, corresponding to a normal operation wherein an intake stroke, a compression stroke, an expansion stroke, and an exhaust stroke are performed in one cycle, and an irregular operation mode, corresponding to a later-described irregular four-cycle operation (hereinafter referred to as an irregular four-cycle operation).

A variety of known devices may be employed as the adjustable valve mechanism 41, and a description thereof is omitted.

In an intake system, an air cleaner 21, an exhaust pipe 22, a throttle body 23, a surge tank 24 and an intake manifold 25 are disposed in this order from the upstream side thereof. The intake port 11 is disposed downstream of the intake manifold 25. The throttle body 23 is provided with an electronically controlled throttle valve (ETV) 30 that adjusts the amount of air flowing into the combustion chamber 5 according to an accelerator angle. The ETV is also used to control an idling speed and suction of a large amount of intake air during operation at a lean air-fuel ratio as described later.

Further, an air flow sensor that detects the flow of the intake air is provided just downstream of the air cleaner 21. The throttle body 23 has a throttle position sensor 38 that detects a throttle angle of the ETV 30 and an idle switch 39 that outputs an idle signal when it detects a fill closure of the ETV 30.

In an exhaust system, an exhaust manifold 26, which has the exhaust port 13, and an exhaust pipe 27 are disposed in this order from the upstream side thereof. A three-way catalyst 29 for purifying the exhaust gases is mounted in the exhaust pipe 27 with freedom of movement. The exhaust manifold 26 has an $O_2$ sensor 40.

Although a fuel supply system is not illustrated, fuel with its pressure being controlled to be a predetermined high pressure (more than 10 times the atmospheric pressure (e.g. between 2 Mpa and 7 Mpa)) is carried to the fuel injection valve 6 so that high-pressure fuel can be injected from the fuel injection valve 6.

An electronic control unit (ECU) 60 serving as a control means of the internal combustion engine is provided to control the operation of engine control components such as the spark plug 4 and the fuel injection valve 6. The ECU 60 has an input/output device; a storage device for storing a control program, a control map and the like; a central processing unit and other devices such as a timer and a counter. The ECU 60 controls the engine control components according to sensor information from the above various sensors, positional information from a key switch, and other information.

In particular, the engine of the present embodiment is a direct injection type engine that is capable of injecting fuel in any desired timings. This engine can uniformly mix air and fuel in a uniform combustion by injecting the fuel mainly in the intake stroke, and can also inject fuel mainly in the compression stroke to perform a stratified combustion by the above-mentioned longitudinal swirl flow.

Further, the engine of the present embodiment is capable of carrying out an irregular four-cycle operation in which two compression strokes and two expansion strokes are performed in one combustion cycle, and a normal four-cycle operation in which the intake stroke, the compression stroke, the expansion stroke, and the exhaust stroke are performed in one combustion cycle. In the irregular four-cycle operation mode, a first combustion process comprised mainly of the stratified combustion and a second combustion process comprised mainly of the uniform combustion are performed in one cycle.

The ECU 60 selects one operation mode according to an engine revolutionary speed (hereinafter referred to as an engine speed) Ne and a target average effective pressure Pe (target Pe) indicating the load incurred to the engine. In a range where the engine speed Ne is lower than a predetermined value $Ne_0$ and the target value Pe is smaller than a predetermined value $Pe_0$, the ECU 60 selects the irregular four-cycle operation mode. In a range where the engine speed Ne is not less than a predetermined value $Ne_0$ or the target value Pe is not less than a predetermined value $Pe_0$, the ECU 60 selects the ordinary four-cycle operation mode. The ordinary four-cycle operation mode and the irregular four-cycle operation mode are switched to one another by means of an adjustable valve mechanism 41.

As stated above, the engine according to the present embodiment executes the irregular four-cycle operation mode when it is partially loaded except when it is heavily loaded or is revolving at a high speed.

Figure 2:
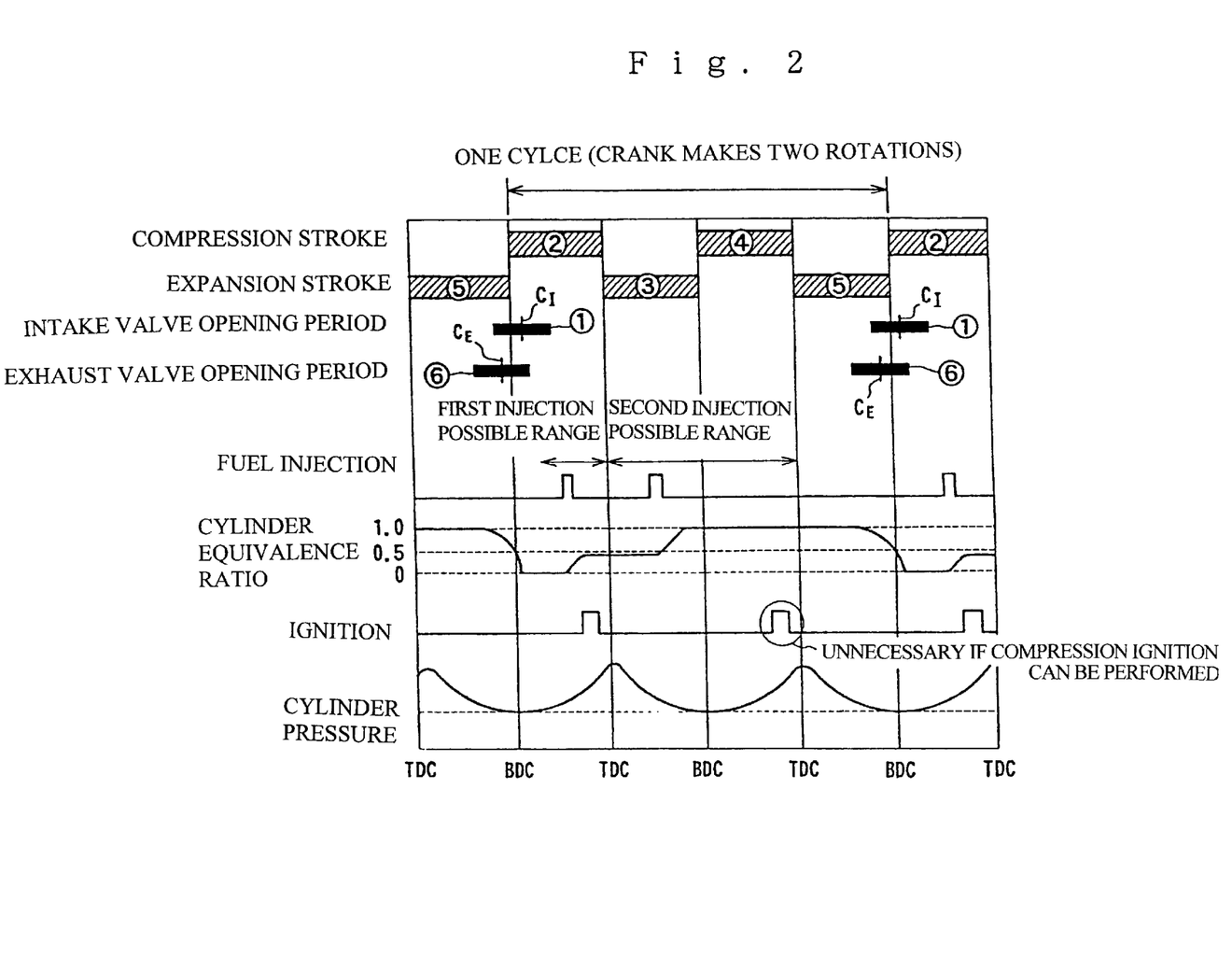
FIG. 2 is a time chart showing an operation of the direct injection type internal combustion engine according to the embodiment of the present invention.

There will now be described a cycle of engine operation according to the present embodiment. As shown in FIG. 2, the engine, according to the present embodiment carries out an irregular four-stroke one-cycle operation (the irregular four-cycle operation) wherein the first compression stroke ②, the first expansion stroke ③, the second compression stroke ④, and the second expansion stroke ⑤ are sequentially repeated. An intake ① and an exhaust ⑥ are performed in an overlapped manner between the second half of the second expansion stroke ⑤ and the first half of the first compression stroke ② following the second expansion stroke ⑤ (a period between the second expansion stroke ⑤ and the first compression stroke ②, the period in which a piston in the combustion chamber is positioned in proximity to a bottom dead center (BDC)). In this case, a center $C_E$ of the exhaust valve 12 opening period is set at the end of the second expansion stroke ⑤, and a center $C_I$ of the intake valve 10 opening period is set at the beginning of the first compression stroke ②. The exhaust ⑥ is started earlier than the intake ①, and the intake ① is finished later than the exhaust ⑥, so that the scavenging operation can be carried out efficiently.

Further, the intake forms the longitudinal swirl flow in the combustion chamber 5 as stated above, and this achieves a high scavenging efficiency.

Figure 4:
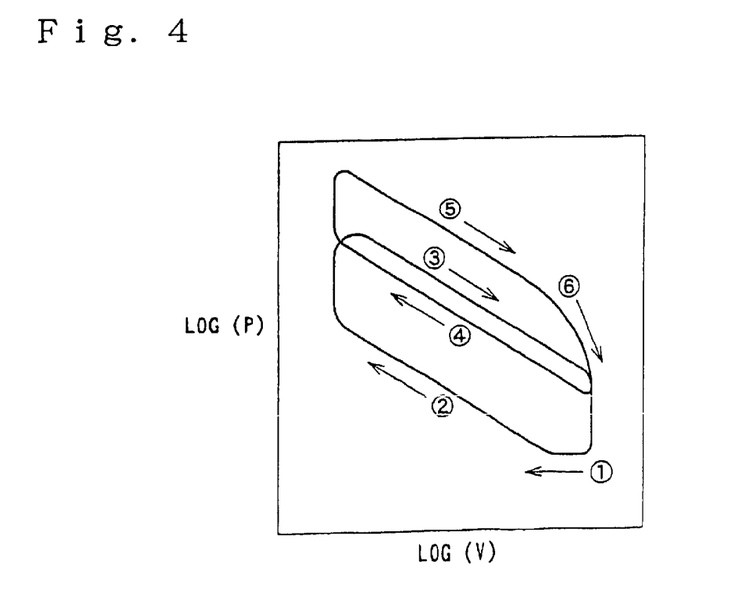
FIG. 4 is a P.V. diagram showing the operation of the direct injection type internal combustion engine according to the embodiment of the present invention.

The engine according to the present invention performs a first combustion process for burning fuel (the first fuel), which is injected in the first compression stroke ②, and a second combustion process for injecting additional fuel (the second fuel) into burnt gases generated in the first combustion process and burning the additional fuel from the second compression stroke ② to the second expansion stroke ⑤. These processes are shown by a P.V. diagram of FIG. 4 (FIG. 4 is a log—log graph).

As shown in FIG. 2, the fuel can be injected at any one point during the first expansion stroke ③ and the second compression stroke ④ in the second combustion process. In the description of the present embodiment, however, the additional fuel (the second fuel) is injected in the first expansion stroke ③.

In the irregular four-cycle operation, an open-loop controlling operation is carried out so that the air-fuel ratio can be equal to a target value. The ECU 60 separately determines a target air-fuel ratio in the main fuel injection and a target air-fuel ratio in the total injection according to an engine operating state. The ECU 50 controls the main fuel injection volume and the total fuel injection volume so that the fuel injection volume in the main fuel injection (the first fuel injection), the total fuel injection volume in the main fuel injection, and the additional fuel injection (the second fuel injection) can be at predetermined respective target air-fuel ratios with respect to the volume of the air taken in the intake stroke.

According to the present invention, nearly ½ of the fuel is injected in the main fuel injection, and a little over ½ of the fuel is injected in the additional fuel injection.

The above target air-fuel ratio is determined according to the target Pe and the engine speed Ne on the basis of the map. A lean air-fuel ratio is set with respect to the intake volume sensed by the air flow sensor 37 because the intake air blows out during scavenging.

According to the present embodiment, as shown in FIG. 2, the spark plug 4 performs ignition just before a top dead center (TDC) in the first compression stroke ② in the second combustion process, and the spark plug 4 performs ignition just before a top dead center (TDC) in the second compression stroke ④ in the second compression process.

Figure 3:
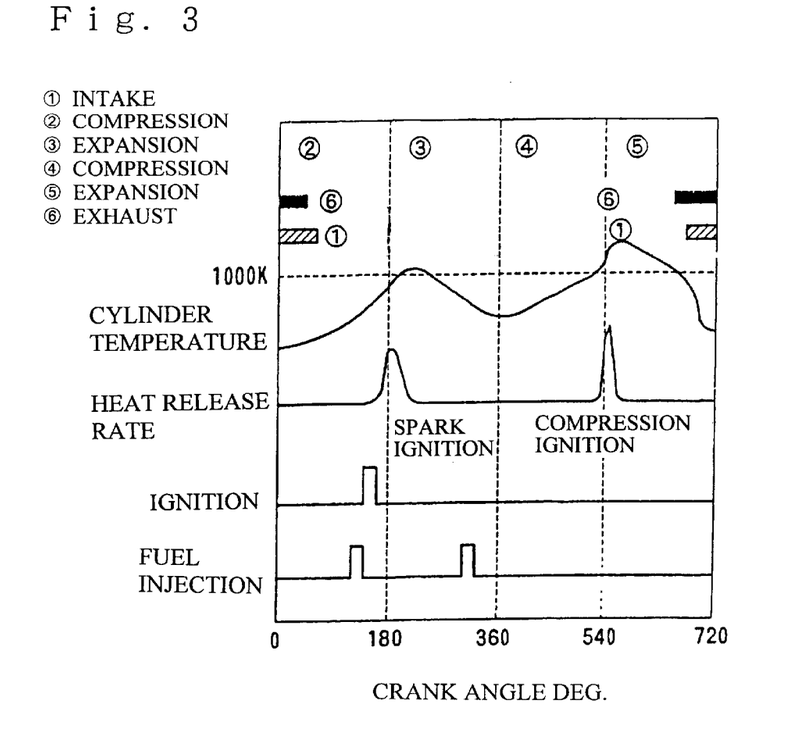
FIG. 3 a time chart showing the operation of the direct injection type internal combustion engine according to the embodiment of the present invention.

In the second combustion process, however, the self ignition can be performed in the compression stroke when the cylinder temperature is sufficiently high. Thus, if it is possible to reliably perform combustion by compression self ignition, the spark plug 4 is inhibited from performing ignition as shown in FIG. 3. Whether the compression self ignition is possible or not (the determination about the possibility of the compression self ignition) depends on at least one of the following: the engine speed, the engine load, the ratio of the fuel injection volume between the first injection to the second injection, the air-fuel ratio in the first combustion, and the second fuel injection timing.

In the second compression process, the self ignition is performed if the cylinder temperature is sufficiently high. Accordingly, at least one of the engine speed, the engine load, the ratio of the fuel injection volume between the first injection to the second injection, the air-fuel ratio in the first combustion, and the second fuel injection timing may be controlled according to the engine speed and the engine load to make the compression self ignition possible.

In the case of a gasoline engine, the cylinder temperature does not increase to such an extent as to enable the self ignition, and thus the spark plug 4 preferably performs ignition without fail.

In the direct injection type internal combustion engine according to one embodiment of the present invention constructed in the above-mentioned manner, the irregular four-cycle operation is carried out by performing the first compression stroke ②, the first expansion stroke ③, the second compression stroke ④, and the second expansion stroke ⑤ in this order, when the engine is partially loaded with the target value Pe being smaller than the predetermined value $Pe_0$ and the engine speed Ne being lower than the predetermined value $Ne_0$.

That is, the exhaust valve 12 and the intake valve 10 are opened first in this order when the piston 8 goes down so that the intake ① and the exhaust ⑥ can be performed in an overlapped manner for scavenging the burnt gases.

Figure 5A:
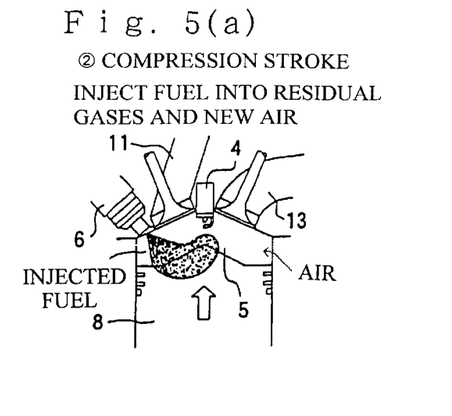
FIG. 5(a) shows a state in a first compression stroke in which main fuel (the first fuel) is injected into residual gases or new air.

The exhaust valve 12 and the intake valve 10 are then closed in this order when the piston 8 goes up so that the fuel can be injected from the fuel injection valve 6 (the main fuel injection) as shown in FIG. 5(a) while the piston 8 is going up (the first compression stroke ②). In the main fuel injection, the fuel with nearly ½ of the fuel volume corresponding to the target air-fuel ratio with respect to the volume of the air taken in the intake stroke ① is injected.

Figure 5B:
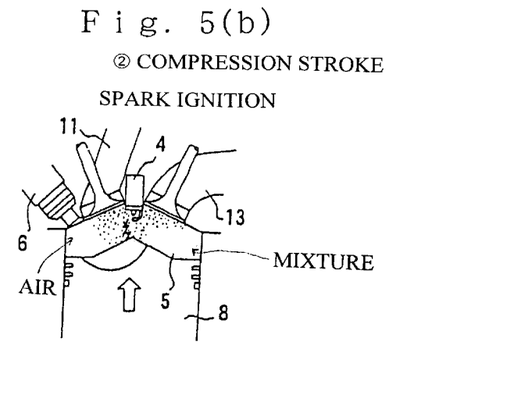
FIG. 5(b) shows a state in the first compression stroke in which spark ignition is performed to burn the main fuel around an ignition plug.

When the piston 8 reaches a point in proximity to a compression top dead center, the spark plug 4 performs a spark ignition to cause the first combustion as shown in FIG. 5(b). In this first combustion, the first expansion stroke ③ is performed by a lean stratified combustion (lean stratified charge combustion) in which ignitable mixtures with high fuel concentrations are collected in proximity to the ignition plug 4 with the total air-fuel ratio being kept at a lean ratio as shown in FIG. 5(c).

Figures 5C, 5D:
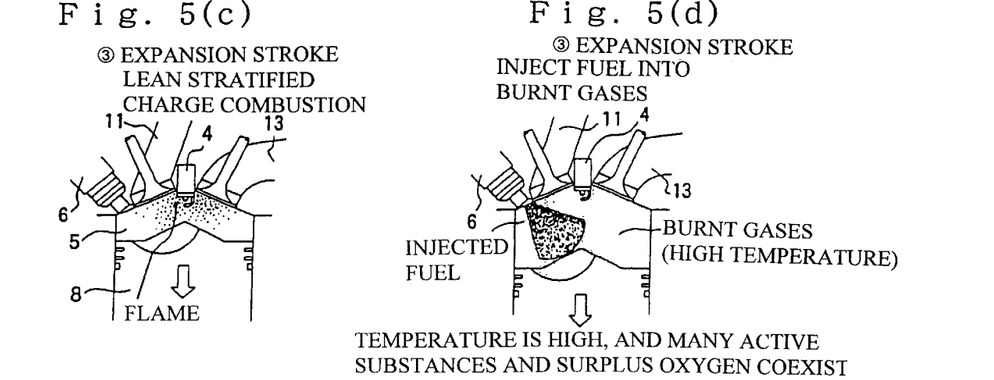
FIG. 5(c) shows a state in a first expansion stroke in which the main fuel overconcentrated around the ignition plug is burnt in lean stratified charge combustion by the spark ignition.
FIG. 5(d) shows a state in the first expansion stoke in which additional fuel (the second fuel) is injected into high-temperature burnt gases of the main fuel wherein many active substances and surplus oxygen coexist.

As shown in FIG. 5(d), when additional fuel is injected into high-temperature burnt gases in the middle of the first expansion stroke ③ following the first combustion (the first combustion process) or in the middle of the second compression stroke ④, not illustrated, fuel, many active substances (burnable components) in the burnt gases, and surplus oxygen coexist in the high-temperature atmosphere in the cylinder.

Figure 5E:
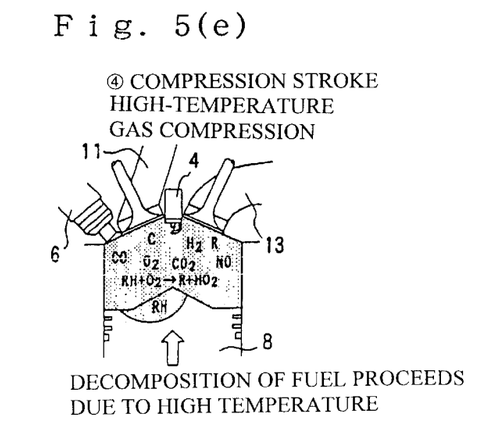
FIG. 5(e) shows a state in a second compression stroke in which decomposition of the additional fuel injected into the burnt gases proceeds in high-temperature cylinder atmosphere.

Since the above high-temperature gases are compressed in the following second expression stroke ④, the decomposition of the fuel is accelerated at high temperature and high pressure, and the mixture of the air and the fuel is also accelerated as shown in FIG. 5(e). If the spark plug 4 performs a spark ignition at a point in proximity to a top dead center of the second compression stroke ④, the second combustion (the second combustion process) can be performed very efficiently.

Figure 5F:
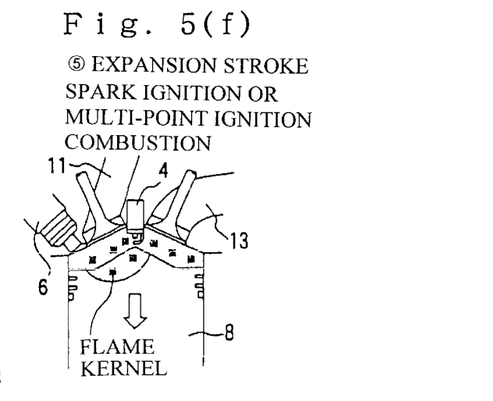
FIG. 5(f) shows a state in the second expansion stroke in which the additional fuel is burnt in a multi-point self ignition combustion or spark ignition combustion by making use of an in-cylinder temperature and pressure.

If the cylinder temperature is sufficiently high, the fuel in the cylinder ignites itself due to the high temperature and pressure at the end of the compression stroke (in proximity to the top dead center of the second compression stroke ④ as shown in FIG. 5(f) even if the ignition plug 4 does not perform spark ignition. In this case, the mixture of the fuel and the burnt gases proceeds if there is a sufficient interval between the end of the additional fuel injection and the top dead center of the second compression stroke ④. This forms a uniform mixture to cause multi-point self ignition in which the ignition is performed at multiple points in the cylinder (combustion chamber). Therefore, the second combustion (the second combustion process) can be performed very efficiently. This irregular four-cycle operation of the engine according to the present embodiment reduces a pumping loss and improves the combustion efficiency in the lean stratified charge spark ignition combustion (the combustion in the first combustion process) resulting from the injection in the compression stroke just after the intake ① (the main fuel injection).

In the second combustion process just after the first combustion process, the fuel is further injected into the high-temperature burnt gases including a large amount of reacting unburnt active substances and oxygen. The injected fuel is rapidly carbureted (or decomposed) in the high-temperature atmosphere and is therefore burned easily. In this combustion (the combustion in the second combustion process), the above-mentioned unburnt substances including HC and $HO_x$ also perform oxidizing reaction again at the same time. This enables very efficient combustion and reduces the exhaust gas emission that must be purified. A part of $NO_x$ effectively reacts to H removed from the fuel during the recompression (the second compression stroke) ④, and is reduced during this compression stroke.

If the second compression process is performed by spark ignition, the combustion can be performed without fail. Moreover, the $NO_x$ in the residual gases is diluted by $CO_2$ in the residual gases, and this lowers an emission level of $NO_x$.

If the second combustion process is performed by compression self ignition, the premixed mixture is ignited at multiple points as stated above. This significantly reduces the output of $NO_x$, HC, and soot, and improves the combustion efficiency.

Further, the exhaust gases resulting from the first combustion process and the second combustion process are exhausted in the exhaust stroke ⑥ after the combustion, as stated above. This significantly reduces the actual emission exhausted from the engine.

Further, the exhaust ⑥ and the intake ① are performed in a predetermined short period of time between the second half of the second expansion stroke ⑤ and the first half of the first compression stroke ①. Therefore, the burnt gases generated in the second combustion process ⑤ is not completely eliminated from the cylinder, and thus the first combustion process is performed with a relatively large amount of residual gases being present. This reduces the generation of $NO_x$.

Further, there is only a small difference between the engine according to the present invention and the conventional engine from the structural point of view because they are different only in their operation cycles. Thus, the above effects can be achieved without substantially increasing the manufacturing cost.

Further, it is possible to change the concentration of oxygen in the unburnt gases, serving as operational gases in the second combustion process, the concentration of combustion products such as $CO_2$ and CO, and the temperature of the gases, by adjusting the ratio of the fuel injection volume between the first injection and the second injection, and setting of the second fuel injection timing. This significantly increases the freedom in controlling the engine, and realizes the premixed mixture compression ignition (compression self ignition) in wide load and speed ranges.

Moreover, the engine according to the present embodiment makes it possible to omit an external EGR from the intake system, and makes it possible to prevent pollution of the intake system and deposition of carbon in the intake system.

Further, the engine according to the present embodiment makes it possible to omit a lean $NO_x$, and thus reduces the cost and simplifies the engine controlling operation.

Figure 6:
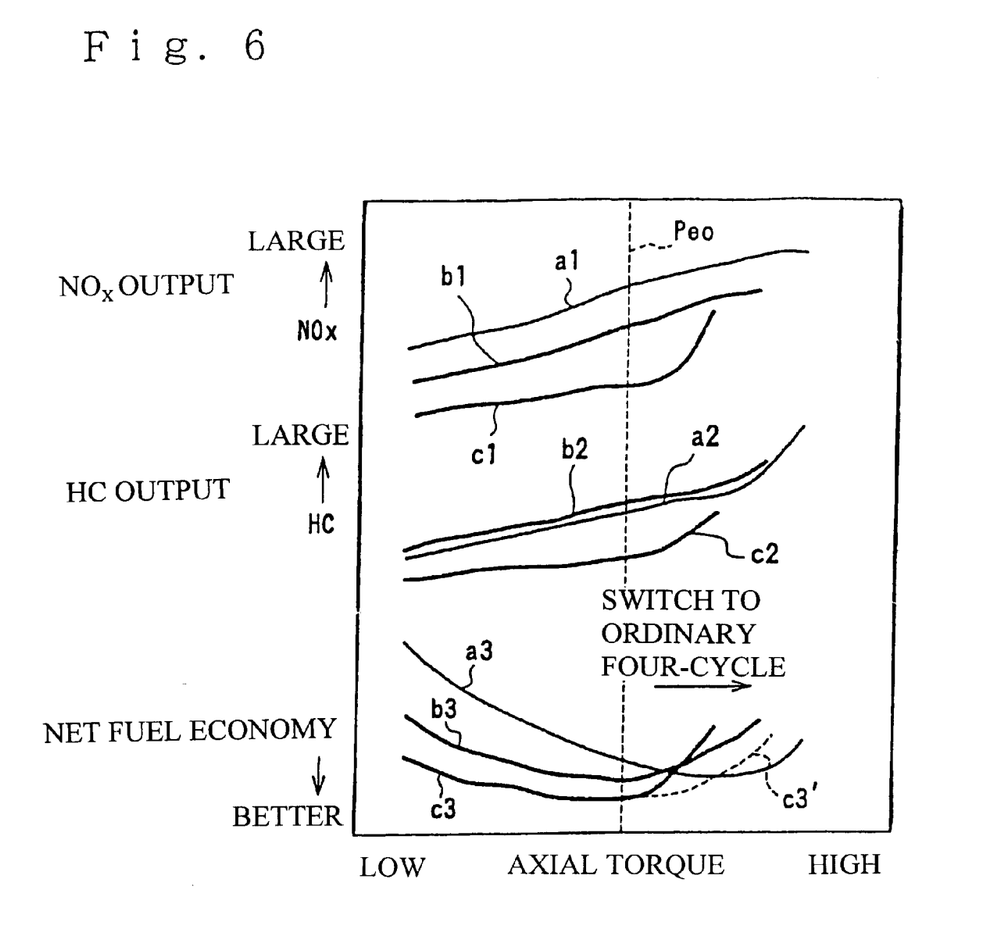
FIG. 6 is a diagram showing effects of the direct injection type internal combustion engine according to the embodiment of the present invention.

FIG. 6 shows the NOx output, the HC output, and the net fuel economy. A line a indicates the ordinary four-cycle premixed combustion, a line b indicates the ordinary four-cycle lean stratified charge combustion, and a line c indicates the irregular four-cycle operation. Reference numeral 1 indicates the $NO_x$ output, reference numeral 2 indicates the HC output, and reference numeral 3 indicates the net fuel economy. If the load is smaller than the predetermined value $Pe_0$, the engine performs the irregular four-cycle operation, and if the load is not less than the predetermined value Pe0, the engine performs the ordinary four-cycle premixed combustion. Thus, the $NO_x$ output, the HC output, and the net fuel economy can be maintained at preferable levels in a wide axial torque range (engine load range) as is clear from FIG. 6.

It should be understood that there is no intention to limit the invention to the specific forms disclosed, but to the contrary, the invention is to cover all modifications, alternate constructions and equivalents falling within the spirit and scope of the invention as expressed in the appended claims. For example, the additional fuel injection timing is set in the first expansion stroke ③, but it may be set from the first expansion stroke ③ to the second compression stroke ④ or set in the second compression stroke ④ insofar as the additional fuel is sufficiently activated and mixed with air.

Further, according to the above embodiment, the volume of the fuel injected in the main fuel injection (the first injection) is nearly ½ of the total fuel volume, but it may arbitrarily be set within the range between about 0.1 and 0.5, which is preferable because an excessively high equivalence ratio makes the combustion difficult due to a large amount of inactive gases and an excessively low equivalence ratio makes the stable ignition impossible.

The ratio of the first injection volume to the second injection volume, however, affects vibrations resulting from a difference between the first combustion and the second combustion, and the amount and temperature of the residual gases for achieving the high-temperature self ignition in the second combustion. If the first injection volume is excessively rich, the residual gases have an excessive concentration (the equivalence ratio is 0.5 and the EGR ratio is 100%). From this standpoint, it is necessary to restrict the first fuel injection volume. It is therefore preferable to reduce the first fuel injection volume and, accordingly, increase the second fuel injection volume.

According to the above embodiment, the irregular four-cycle is applied only to the light load range because the heavy load causes shortage of the intake air, but the irregular four-cycle operation may also be performed in the heavy load range by using a supercharging device that performs supercharging to achieve a sufficient amount of intake air in the heavy load range. In this case, the net fuel economy is improved even when the axial torque is high (the engine is heavily loaded) as indicated by a dotted-line in FIG. 6.

Further, the engine may perform only the irregular four-cycle operation (does not perform the normal four-cycle operation).

What is claimed is:

1. A direct injection internal combustion engine, comprising:

an intake and exhaust mechanism for intaking and exhausting air for a predetermined period of time between a second half of a second expansion stroke and a first half of a first compression stroke following said second expansion stroke so that said first compression stroke, a first expansion stroke, a second compression stroke, and said second expansion stroke, constituting an irregular four-cycle operation, can be repeated sequentially along with rotation of a crank shaft in said internal combustion engine; and a control device for controlling injection of fuel supplied to at least a combustion chamber in said internal combustion engine, said control device injecting first fuel during said first compression stroke, and injecting second fuel during one of said first expansion stroke and said second compression stroke.

2. A direct injection internal combustion engine according to claim 1, wherein
said control device burns said first fuel, injected during said first compression stroke, by a first spark ignition and burns said second fuel, injected into burnt gases generated during a combustion process of said first fuel, by a second spark ignition.

3. A direct injection internal combustion engine according to claim 1, wherein
said control device burns said first fuel, injected during said first compression stroke, by a spark ignition, and burns said second fuel, injected into burnt gases generated during a combustion process of said first fuel, by a compression self ignition.

4. A direct injection internal combustion engine according to claim 1, wherein
said intake and exhaust mechanism starts an exhaust operation earlier than an intake operation, and finish said intake operation later than said exhaust operation.

5. A direct injection internal combustion engine according to claim 1, further comprising:
a supercharging device disposed in an intake system.

6. A direct injection internal combustion engine according to claim 1, wherein
said intake and exhaust mechanism includes an adjustable valve mechanism that switches an operation mode between a normal operation mode for carrying out a normal four-cycle operation, wherein an intake stroke, a compression stroke, an expansion stroke, and an exhaust stroke are sequentially repeated along with rotation of said crank shaft, and an irregular operation mode for carrying out an irregular operation, wherein said first compression stroke, said first expansion stroke, said second compression stroke, and said second expansion stroke are sequentially repeated; and
said control device selects said normal four-cycle operation in said normal operation mode at least when said internal combustion engine is operating under a high load.

7. A direct injection internal combustion engine according to claim 1, wherein
said control device carries out an open-loop controlling operation such that a total fuel amount of said first fuel and said second fuel has a predetermined air-fuel ratio with respect to an amount of intake air.

8. A direct injection internal combustion engine according to claim 7, wherein
said control device controls an amount of said first fuel to a value between about 1/10 and about 1/2 of said total fuel amount, and controls an amount of said second fuel to a differential fuel amount between said total fuel amount and the amount of said first fuel injected.

9. A direct injection internal combustion engine according to claim 7, wherein
said control device determines whether said second fuel can be burned by a compression self ignition according to at least one of the following: a rotational speed of said internal combustion engine, a load on said internal combustion engine, a ratio of said first fuel amount to said second fuel amount, an air-fuel ratio during burning of said first fuel, and an injection timing of said second fuel, and said control device burns said second fuel, injected in one of said first expansion stroke and said second compression stroke, by a spark ignition when it is determined that said second fuel cannot be burned by the compression self ignition.

10. A direct injection internal combustion engine according to claim 7, wherein
said control device makes said second fuel burnable by a compression self ignition by controlling at least one of the following: the rotational speed of said internal combustion engine, the load on said internal combustion engine, a ratio of said first fuel amount to said second fuel amount, an air-fuel ratio during burning of said first fuel, and an injection timing of said second fuel.

11. A direct injection internal combustion engine according to claim 1, wherein
said control device injects said first fuel during said first compression stroke such that said first fuel performs a stratified charge combustion, and injects said second fuel in said first expansion stroke such that said second fuel performs a uniform combustion.

12. A method for controlling a direct injection internal combustion engine, comprising:
carrying out an intake operation and an exhaust operation for a predetermined period of time between a second half of a second expansion stroke and a first half of a first compression stroke following said second expansion stroke to sequentially repeat said first compression stroke, a first expansion stroke, a second compression stroke, and said second expansion stroke, constituting an irregular four-cycle operation, along with rotation of a crank shaft in said internal combustion engine;
injecting first fuel during said first compression stroke; and
injecting second fuel during one of said first expansion stroke and said second compression stroke.

13. The method for controlling a direct injection internal combustion engine according to claim 12, further comprising:
burning said first fuel from said first compression stroke to said first expansion stroke by injecting said first fuel during said first compression stroke; and
burning said second fuel from said second compression stroke to said second expansion stroke by injecting said second fuel into burnt gases generated in said first combustion process.

14. The method for controlling a direct injection internal combustion engine according to claim 12, further comprising:
burning said first fuel, injected during said first compression stroke, by a first spark ignition; and
burning said second fuel, injected into burnt gases generated during a combustion process of said first fuel, by a second spark ignition.

15. The method for controlling a direct injection internal combustion engine according to claim 12, further comprising:
burning said first fuel, injected during said first compression stroke, by a spark ignition; and
burning said second fuel, injected into burnt gases generated during a combustion process of said first fuel, by a compression self ignition.

16. The method for controlling a direct injection internal combustion engine according to claim 12, further comprising:

switching an operation mode between a normal operation mode for carrying out a normal four-cycle operation, wherein an intake stroke, a compression stroke, an expansion stroke, and an exhaust stroke are sequentially repeated along with rotation of said crank shaft in said internal combustion engine, and an irregular operation mode for carrying out an irregular operation, wherein said first compression stroke, said first expansion stroke, said second compression stroke, and said second expansion stroke are sequentially repeated; and selecting said normal four-cycle operation in said normal operation mode at least when said internal combustion engine is operating under a high load.

17. The method for controlling a direct injection internal combustion engine according to claim 12, further comprising:

carrying out an open-loop controlling operation such that a total fuel amount of said first fuel and said second fuel has a predetermined air-fuel ratio with respect to an amount of intake air.

18. The method for controlling a direct injection internal combustion engine according to claim 12, further comprising:

controlling an amount of said first fuel to a value between about $1/10$ and about $1/2$ of said total fuel amount, and controlling an amount of said second fuel to a differential fuel amount between said total fuel amount and the amount of said first fuel injected.

19. The method for controlling a direct injection internal combustion engine according to claim 12, further comprising:

determining whether said second fuel can be burned by a compression self ignition according to at least one of the following: a rotational speed of said internal combustion engine, a load on said internal combustion engine, a ratio of said first fuel amount to said second fuel amount, an air-fuel ratio during burning of said first fuel, and an injection timing of said second fuel; and burning said second fuel, injected in at least one of said first expansion stroke and said second compression stroke, by a spark ignition when it is determining that said second fuel cannot be burned by the compression self ignition.

20. The method for controlling a direct injection internal combustion engine according to claim 12, wherein said step of injecting first fuel includes the step of, injecting said first fuel during said first compression stroke such that said first fuel performs stratified charge combustion, and said step of injecting second fuel includes the step of, injecting said second fuel in said first expansion stroke such that said second fuel performs uniform combustion.

21. A direct injection internal combustion engine, comprising:

an intake and exhaust mechanism for intaking and exhausting air for a predetermined period of time between a second half of a second expansion stroke and a first half of a first compression stroke following said second expansion stroke so that said first compression stroke, a first expansion stroke, a second compression stroke, and said second expansion stroke can be repeated sequentially along with rotation of a crank shaft in said internal combustion engine; and a control device for controlling injection of fuel supplied to at least a combustion chamber in said internal combustion engine, said control device injecting first fuel during said first compression stroke, and injecting second fuel during one of said first expansion stroke and said second compression stroke when a rotational speed of said internal combustion engine is lower than a first predetermined value and a load on said internal combustion engine is lower than a second predetermined value.

22. A method for controlling a direct injection internal combustion engine, comprising:

carrying out an intake operation and an exhaust operation for a predetermined period of time between a second half of a second expansion stroke and a first half of a first compression stroke following said second expansion stroke to sequentially repeat said first compression stroke, a first expansion stroke, a second compression stroke, and said second expansion stroke along with rotation of a crank shaft in said internal combustion engine;

injecting first fuel during said first compression stroke; and injecting second fuel during one of said first expansion stroke and said second compression stroke when a rotational speed of said internal combustion engine is lower than a first predetermined value and a load on said internal combustion engine is lower than a second predetermined value.

* * * * *